(12) United States Patent
Miyazawa et al.

(10) Patent No.: US 8,119,093 B2
(45) Date of Patent: Feb. 21, 2012

(54) $C_{70}$ FULLERENE TUBE AND PROCESS FOR PRODUCING THE SAME

(75) Inventors: Kun-ichi Miyazawa, Tsukuba (JP); Tetsuro Yoshii, Osaka (JP)

(73) Assignee: National Institute for Materials Science, Ibaraki (JP)

( * ) Notice: Subject to any disclaimer, the term of this patent is extended or adjusted under 35 U.S.C. 154(b) by 0 days.

(21) Appl. No.: 11/631,377

(22) PCT Filed: Jun. 30, 2005

(86) PCT No.: PCT/JP2005/012525
§ 371 (c)(1),
(2), (4) Date: Dec. 29, 2006

(87) PCT Pub. No.: WO2006/004174
PCT Pub. Date: Jan. 12, 2006

(65) Prior Publication Data
US 2008/0089827 A1    Apr. 17, 2008

(30) Foreign Application Priority Data

Jun. 30, 2004  (JP) .................................. 2004-194174
Sep. 27, 2004  (JP) .................................. 2004-279999

(51) Int. Cl.
*C01B 31/02*    (2006.01)
(52) U.S. Cl. ............. 423/445 B; 423/447.1; 423/447.2; 977/734

(58) Field of Classification Search .............. 423/445 B, 423/447.1, 447.2; 977/734
See application file for complete search history.

(56) References Cited

U.S. PATENT DOCUMENTS 5,662,876 A * 9/1997 Tour et al. ................. 423/445 B
2002/0192143 A1* 12/2002 Miyazawa et al. ......... 423/447.2

FOREIGN PATENT DOCUMENTS
JP         2003-1600         1/2003

OTHER PUBLICATIONS

Miyazawa, et al., Structural Characterization of the fullerene nanotubes prepared by the liquid-liquid interfacial precipitation method, J. Mater. Res. 2005; 20(3): 688-695.*
Miyazawa, C70 Nanowhiskers Fabricated by Forming Liquid/Liquid Interfaces in the Systems of Toluene Solution of C70 and Isopropyl Alchohol, J. Am. Chem. Soc. 2002; 85(5): 1297-1299.*
Miyazawa, et al., Structural investigation of the C60/C70 whiskers fabricated by forming liquid-liquid interfaces of toluene with dissolved C60/C70 and isopropyl alcohol, J. Mater. Res. 2003; 18(5): 1096-1103.*

(Continued)

*Primary Examiner* — Daniel C. McCracken
(74) *Attorney, Agent, or Firm* — Wenderoth, Lind & Ponack, L.L.P.

(57) ABSTRACT

Disclosed is a thin line having a hollow structure portion composed of a $C_{70}$ fullerene molecule, which is a novel functional material useful for a capsule for containing various chemical substances, a reaction site, a gas adsorbent, a catalyst supporting material, an electrode material, a semiconductor and the like. Also disclosed is a method for producing the same.

10 Claims, 9 Drawing Sheets

OTHER PUBLICATIONS

Masahisa Tono et al., "$C_{60}/C_{70}$ Kongo fullerene Nanowhisker no Bikozo", The Japan Institute of Metals Shuki Taikai Koen Gaiyo, Oct. 11, 2003, p. 565.

K. Miyazawa et al., Structural characterization of the fullerene nanotubes prepared by the liquid-liquid interfacial precipitation method, J. Mater Res, 2005.3, vol. 20, No. 3, pp. 688-695.

Kun'ichi Miyazawa et al., "*Transmission electron microscopy investigation of tubular and capsular needlelike crystals of $C_{60}$ produced by the liquid-liquid interfacial precipitation method*", J. Mater. Res., vol. 19, No. 11, pp. 3145-3148 (2004).

Huibiao Liu et al., "*Imaging As-Grown [60]Fullerene Nanotubes by Template Technique*", J. Am. Chem. Soc., vol. 124, pp. 13370-13371 (2002).

M. Tachibana et al., "Photo-assisted growth and polymerization of $C_{60}$ 'nano'whiskers", Chemical Physics Letters 374, (2003), pp. 279-285.

S. Lee et al., "$C_{60}$ nanowhisker synthesis using a microchannel reactor", Letters to the Editor/Carbon 43, (2005), pp. 855-894.

J. Minato et al., "Solvated structure of $C_{60}$ nanowhiskers", Carbon 43, (2005), pp. 2837-2841.

M. Sathish et al., "Nanoporous Fullerene Nanowhiskers", Chemical Materials, (2007), 19, pp. 2398-2400.

S. Cha et al., "Vertically Well-Aligned $C_{60}$ Microtube Crystal Array Prepared Using a Solution-Based, One-Step Process", Chemical Materials, (2008), 20, pp. 1667-1669.

J. Minato et al., "Structural characterization of $C_{60}$ nanowhiskers and $C_{60}$ nanotubes fabricated by the liquid-liquid interfacial precipitation method", Diamond and Related Materials 15, (2006), pp. 1151-1154.

T. Kizuka et al., "Young's modulus of crystalline $C_{60}$ nanotubes studied by in situ transmission electron microscopy", Diamond and Related Materials 17, (2008), pp. 972-974.

K. Miyazawa et al., "Structural investigation of heat-treated fullerene nanotubes and nanowhiskers", Diamond and Related Materials 15, (2006), pp. 1143-1146.

K. Asaka et al., "Fracture surface and correlation of buckling force with aspect ratio of $C_{60}$ crystalline whiskers", Diamond and Related Materials 16, (2007), pp. 1936-1939.

C. Ringor et al., "Synthesis of $C_{60}$ nanotubes by liquid-liquid interfacial precipitation method: Influence of solvent ratio, growth temperature, and light illumination", Diamond and Related Materials 17, (2008), pp. 529-534.

K. Miyazawa et al., "$C_{60}$ Nanowhiskers in a Mixture of Lead Zirconate Titanate Sol-$C_{60}$ Toluene Solution", Journal of the American Ceramic Society, vol. 84, No. 12, (2001), pp. 3037-3039.

K. Miyazawa et al., "Structural Analysis of $C_{60}$ Nanotubes Heat-Treated in Vacuum", The Institute of Electrical Engineers of Japan, vol. 128, No. 8, (2008), pp. 317-320.

M. Watanabe et al., "Bending Deformation of $C_{60}$ Nanowhiskers in Solution and Air", The Institute of Electrical Engineers of Japan, vol. 128, No. 8, (2008), pp. 321-324.

K. Miyazawa et al., "Transmission electron microscopy investigation of fullerene nanowhiskers and needle-like precipitates formed by using $C_{60}$ and $(\eta^2-C_{60})Pt(PPh_3)_2$", Journal of the Materials Research Society, vol. 19, No. 9, (2004), pp. 2410-2414.

K. Miyazawa et al., "$C_{60}$ nanowhiskers formed by the liquid-liquid interfacial precipitation method", Journal of the Materials Research Society, vol. 17, No. 1, (2002), pp. 83-88.

K. Miyazawa et al., "Formation of iodine-doped $C_{60}$ whiskers by the use of liquid-liquid interfacial precipitation method", Journal of the Materials Research Society, vol. 17, No. 9, (2002), pp. 2205-2208.

K. Miyazawa et al., "Structural characterizations of the $C_{60}[C(COOC_2H_5)_2]$ whiskers prepared by the liquid-liquid interfacial precipitation method", Journal of the Materials Research Society, vol. 18, No. 11, (2003), pp. 2730-2735.

J. Minato et al., "Characterization of high-pressure sintered $C_{60}$ nanowhiskers and $C_{60}$ powder", Journal of the Materials Research Society, vol. 20, No. 3, (2005), pp. 742-746.

J. Minato et al., "$C_{60}$ fullerene tubes as removable templates", Journal of the Materials Research Society, vol. 21, No. 2, (2006), pp. 529-534.

K. Miyazawa et al., "Platinum chloride deposition into $C_{60}$ nanotubes", Materials Letters, vol. 62, (2008), pp. 410-413.

K. Miyazawa et al., "Structural characterization of $C_{60}$ nanowhiskers formed by the liquid/liquid interfacial precipitation method", Surface and Interface Analysis, vol. 35, (2003), pp. 117-120.

J. Minato, "Morphology of $C_{60}$ nanotubes fabricated by the liquid-liquid interfacial precipitation method", Science and Technology of Advanced Materials, vol. 6, (2005), pp. 272-277.

K. Miyazawa et al., "Characterization of fullerene nanotubes prepared by the liquid-liquid interfacial precipitation method", Science and Technology of Advanced Materials, vol. 6, (2005), pp. 388-393.

\* cited by examiner

← Growth axis →

241 nm

$C_{70}$ FULLERENE TUBE AND PROCESS FOR PRODUCING THE SAME

TECHNICAL FIELD

The invention of this application relates to a $C_{70}$ fullerene tube and a process for producing the same. More specifically, the invention of this application relates to a novel $C_{70}$ fullerene tube having catalyst supportability and a process for producing the same.

BACKGROUND ART

The presence of fullerenes was experimentally proved by researchers abroad in 1985. However, its structural model had been already known in Japan in 1970. Thus, Japan has always led so far the world in studies of fullerenes. A $C_{60}$ fullerene has been known as a typical fullerene. Various fullerenes such as $C_{70}$, $C_{76}$, $C_{78}$, $C_{82}$, $C_{84}$, $C_{240}$, $C_{540}$ and $C_{720}$ fullerenes other than a $C_{60}$ fullerene have been known. The technology in the field of fullerenes has been progressed very quickly, and new fullerene compounds have been introduced one after another. A method for forming a shell structure made of a fullerene or amorphous carbon by vacuum heat treatment of $C_{60}$ crystal as a typical fullerene (non-Patent Document 1), a method for forming fullerene whiskers (carbon thin lines) by liquid-liquid interfacial precipitation and the like have been lately proposed by the inventors of this application (for example, Patent Document 1 and non-Patent Documents 2 and 3).

Patent Document 1: Gazette of JP-A-2003-1600
non-Patent Document 1: H. Sakuma, M. Tachibana, H. Sugiura, K. Kojima, S. Ito, T. Sekiguchi, Y. Achiba, J. Mater, Res., 12 (1997) 1545.
non-Patent Document 2: K. Miyazawa, Y. Kuwasaki, A. Obayashi and M. Kuwabara, "C60 nanowhiskers formed by the liquid-liquid interfacial precipitation method", J. Mater, Res., 17[1] (2002) 83.
non-Patent Document 3: Kuni-ichi Miyazawa, "C70 Nanowhiskers Fabricated by Forming Liquid/Liquid interfaces in the Systems of Toluene Solution of C70 and Isopropyl Alcohol", J. Am. Ceram. Soc., 85[5] (2002) 1297.

Disclosure of Invention

Although the great development in future has been expected on the foregoing materials proposed by the inventors, approaches for better materials have been still unexplored.

Under the foregoing circumstances, the invention of this application has been made, and aims to provide a new functional material which is useful for a capsule for containing various chemical substances, a reaction site, a gas adsorbent, a catalyst supporting material, an electrode material and the like, and a process for producing the same.

The invention of this application, for solving the foregoing problems, first provides a $C_{70}$ fullerene tube which is a thin line with a hollow structural portion made of a $C_{70}$ fullerene molecule, a wall thickness of the tube being in the range of from 1 to 500 nm.

Second, it provides the $C_{70}$ fullerene tube which further contains a fullerene molecule of at least any of a $C_{60}$ fullerene, higher-order fullerenes other than a $C_{70}$ fullerene, fullerene derivatives and metal-containing fullerenes.

Third, it provides the $C_{70}$ fullerene tube of the second invention which is made of two molecules, the $C_{70}$ fullerene molecule and the $C_{70}$ fullerene molecule, the composition of the $C_{60}$ fullerene molecule and the $C_{70}$ fullerene molecule being $C_{60x}C_{70(1-x)}$ (0<X<1).

Fourth, it provides a $C_{70}$ fullerene tube whose end is closed or open.

Fifth, it provides a $C_{70}$ fullerene tube which is a thin line with a hollow structural portion made of a $C_{70}$ fullerene molecule, a wall thickness of the tube being in the range of from 95 to 130 nm.

Sixth, it provides the $C_{70}$ fullerene tube of the fifth invention, which further contains a fullerene molecule of at least any of a $C_{60}$ fullerene, higher-order fullerenes other than a $C_{70}$ fullerene, fullerene derivatives and metal-containing fullerenes.

Seventh, it provides the $C_{70}$ fullerene tube of the sixth invention, which is made of two molecules, the $C_{60}$ fullerene molecule and the $C_{70}$ fullerene molecule, the composition of the $C_{60}$ fullerene molecule and the $C_{70}$ fullerene molecule being $C_{60x}C_{70(1-x)}$ (0<x<1).

Eighth, it provides the $C_{70}$ fullerene tube of any of the fifth to seventh inventions, whose end is closed or open.

Ninth, it provides a process for producing a $C_{70}$ fullerene tube which is a thin line with a hollow structural portion made of a $C_{70}$ fullerene molecule, the process comprising at least the following steps, (A) a step of adding, to a solution of the $C_{70}$ fullerene molecule in a first solvent, a second solvent having lower solubility of the $C_{70}$ fullerene molecule than that in the first solvent, (B) a step of forming a liquid-liquid interface between the solution and the second solvent, (C) a step of precipitating the $C_{70}$ thin line in the liquid-liquid interface, and (D) a step of selectively dissolving the inside of the $C_{70}$ thin line.

Tenth, it provides a process for producing a $C_{70}$ fullerene tube which is a thin line with a hollow structural portion made of a $C_{70}$ fullerene molecule, the process comprising at least the following steps, (A) a step of adding, to a solution obtained by dissolving in a first solvent a fullerene molecule of at least any of a $C_{60}$ fullerene, higher-order fullerenes other than a $C_{70}$ fullerene, fullerene derivatives and metal-containing fullerenes and the $C_{70}$ fullerene molecule, a second solvent having lower solubility of the fullerene molecule and the $C_{70}$ fullerene molecule than that in the first solvent, (B) a step of forming a liquid-liquid interface between the solution and the second solvent, (C) a step of precipitating the $C_{70}$ thin line made of the fullerene molecule and the $C_{70}$ fullerene molecule in the liquid-liquid interface, and (D) a step of selectively dissolving the inside of the $C_{70}$ thin line.

Moreover, the invention of this application eleventh provides the process for producing the $C_{70}$ fullerene tube, wherein the first solvent is pyridine, and the second solvent is isopropyl alcohol.

BEST MODE FOR CARRYING OUT THE INVENTION

Figure 1:
FIG. 1 is a TEM image of a $C_{70}$ fullerene tube produced in Example 1 of the invention of this application.

The invention of this application has the foregoing characteristics, and the embodiments thereof are described below.

The $C_{70}$ fullerene tube in the invention of this application is a thin line with a hollow structural portion made of a $C_{70}$ fullerene molecule. Further, the $C_{70}$ fullerene tube may contain a fullerene molecule of at least any of a $C_{60}$ fullerene, higher-order fullerenes other than the $C_{70}$ fullerene, fullerene derivatives and metal-containing fullerenes. Especially, it may be a $C_{70}$ fullerene tube made of two components, a $C_{60}$ fullerene molecule and a $C_{70}$ fullerene molecule, the composition of the $C_{60}$ fullerene molecule and the $C_{70}$ fullerene molecule being $C_{60x}C_{70(1-x)}$ (0<x<1). Fullerene derivatives may be various fullerenes ($C_{60}$, $C_{70}$, $C_{82}$ and the like) having various functional groups bound thereto. Metal-containing fullerenes may be these fullerene derivatives containing various metals. Specific examples thereof include fullerenes such as $C_{60}$, $C_{70}$ and $C_{82}$ fullerenes, which have one or more substituents selected from a hydroxyl group, an alkoxy group, an aryl group, an acyl group, an acetyl group, a carboxyl group, an alkoxycarbonyl group, a halogen group, a cyano group, an amino group, an imino group, a nitro group, a mercapto group, an alkylthio group, a sulfonyl group, an acyl group and the like, and these fullerenes further containing a transition metal or a rare earth metal. Preferable examples thereof include diethyl malonate derivatives of a $C_{60}$ fullerene, N-methylpyrrolidine derivatives of a $C_{60}$ fullerene, ferrocene derivatives of a $C_{60}$ fullerene and platinum derivatives of a $C_{60}$ fullerene.

The $C_{70}$ fullerene tube in the invention of this application can have various diameters and lengths. Especially, a $C_{70}$ fullerene tube having a diameter of from 5 nm to 100 μm, a wall thickness of from 1 nm to 1 μm and an aspect ratio (length/diameter) of 2 or more can be provided. Among others, a $C_{70}$ fullerene tube having a wall thickness of from 1 nm to 500 nm, especially from 95 nm to 130 nm and a diameter of more than approximately 200 nm can be obtained. A $C_{70}$ fullerene tube having a diameter of less than 1 μm can be called a $C_{70}$ nanotube. In the $C_{70}$ fullerene tube in the invention of this application, as is apparent from Examples to be described later, $C_{70}$ fullerene molecules (and fullerenes except a $C_{70}$ fullerene, fullerene derivatives and metal-containing fullerenes) are arrayed in order, and filled most densely along the growth axis.

The $C_{70}$ fullerene tube in the invention of this application is, as described above, the thin line with the hollow structural portion made of the $C_{70}$ fullerene molecule. Both ends thereof may be closed or open, or only one end may be closed. Further, a hollow structure may be formed in one part of the thin line.

Various substances can be incorporated in the inside of the $C_{70}$ fullerene tube having the foregoing structure. Examples of the substances include solids such as silicon, titania, glass fine particles, a semiconductor, a polymeric substance, a fullerene and a carbon nanotube, liquids such as alcohol and toluene and gases such as oxygen and hydrogen. The $C_{70}$ fullerene tube in the invention of this application may contain elements other than carbon, such as oxygen and hydrogen, in the surface.

Such a $C_{70}$ fullerene tube is lightweight and can have a large specific surface area, so that a space capable of exhibiting a function of the $C_{70}$ fullerene molecule (fullerenes other than a $C_{70}$ fullerene, fullerene derivatives and metal-containing fullerenes) is large. Accordingly, it can have a possibility of exhibiting an excellent function of the $C_{70}$ fullerene molecule (fullerenes other than a $C_{70}$ fullerene, fullerene derivatives and metal-containing fullerenes) to the full extent. The $C_{70}$ fullerene tube is a fullerene of quite a new shape, and can be used as a precursor for synthesizing various derivatives by chemical treatment. Moreover, by introducing various substances thereinside as stated above or introducing functional substances thereinside, hitherto unknown functions with luminescence or a magnetic function imparted can be exhibited. Therefore, use or application thereof is expected in wide-ranging fields of electric and electronic industries, automobile industries, machine industries, aerospace industries, pharmaceutical industries, energy industries and the like.

Specifically, it is considered to use the $C_{70}$ fullerene tube in a catalyst, a catalyst support, a hydrogen absorbent, an anti-microbial material, an active hydrogen eliminating material, drugs, a filter, a gas separating material, a gas absorbing material, a solar cell material, a low dimensional organic semiconductor, an inside filling template, a mesoporous material, a nozzle for ink jet printer and the like.

The invention of this application also provides a process for producing a $C_{70}$ fullerene tube which is a thin line with a hollow structural portion made of a $C_{70}$ fullerene molecule. Specifically, the process comprises at least the following steps.

A $C_{70}$ fullerene tube with a hollow structural portion is obtained by (A) a step of adding, to a solution of a $C_{70}$ fullerene molecule in a first solvent, a second solvent having lower solubility of the $C_{70}$ fullerene molecule than that in the first solvent, (B) a step of forming a liquid-liquid interface between the solution and the second solvent, (C) a step of precipitating a $C_{70}$ thin line in the liquid-liquid interface, and (D) a step of selectively dissolving the inside of the $C_{70}$ thin line.

In the process for producing the $C_{70}$ fullerene tube in the invention of this application, a fullerene molecule of at least any of a $C_{60}$ fullerene, higher-order fullerenes other than a $C_{70}$ fullerene, fullerene derivatives and metal-containing fullerenes (hereinafter referred to as a "fullerene molecule") may be used as a starting material along with the $C_{70}$ fullerene molecule. The $C_{70}$ fullerene tube produced in this case contains the fullerene molecule along with the $C_{70}$ fullerene molecule, and it is made of these molecules. Especially when the $C_{60}$ fullerene molecule is used as a starting material, the $C_{70}$ fullerene tube made of the two components, the $C_{60}$ fullerene molecule and the $C_{70}$ fullerene molecule, a composition of the $C_{60}$ fullerene molecule and the $C_{70}$ fullerene molecule being $C_{60x}C_{70(1-x)}$ (0<x<1), is obtained. Fullerene derivatives may be various fullerenes ($C_{60}$, $C_{70}$, $C_{82}$ and the like) having various functional groups bound thereto. Metal-containing fullerenes may be these fullerene derivatives containing various metals. Specific examples thereof include fullerenes such as $C_{60}$, $C_{70}$ and $C_{82}$ fullerenes, which have one or more substituents selected from a hydroxyl group, an alkoxy group, an aryl group, an acyl group, an acetyl group, a carboxyl group, an alkoxycarbonyl group, a halogen group, a cyano group, an amino group, an imino group, a nitro group, a mercapto group, an alkylthio group, a sulfonyl group, an acyl group and the like, and these fullerenes further containing a transition metal or a rare earth metal. Preferable examples thereof include diethyl malonate derivatives of a $C_{60}$ fullerene, N-methylpyrrolidine derivatives of a $C_{60}$ fullerene, ferrocene derivatives of a $C_{60}$ fullerene and platinum derivatives of a $C_{60}$ fullerene.

In the invention of this application, the first solvent that dissolves the $C_{70}$ fullerene molecule (and the fullerene molecule) is not particularly limited so long as it can dissolve the $C_{70}$ fullerene molecule (and the fullerene molecule). Especially, pyridine is mentioned as a good solvent having high solubility of the $C_{70}$ fullerene molecule (and the fullerene molecule).

At this time, the $C_{70}$ fullerene molecule (and fullerene molecule) solution may be either a saturated solution or an unsaturated solution. It is preferable to use a saturated solution in particular. When the saturated solution is used, a $C_{70}$ thin line ($C_{70}$ thin line made of a $C_{70}$ fullerene molecule and a fullerene molecule) is effectively precipitated. An additive for increasing solubility of the $C_{70}$ thin line ($C_{70}$ thin line made of the $C_{70}$ fullerene molecule and the fullerene molecule) may be added to the first solvent unless precipitation of the $C_{70}$ thin line ($C_{70}$ thin line made of the $C_{70}$ fullerene molecule and the fullerene molecule) is inhibited.

In the process for producing the $C_{70}$ fullerene tube in the invention of this application, the second solvent may be a solvent system different in type from the first solvent that dissolves the $C_{70}$ fullerene molecule (and the fullerene molecule). Such a second solvent may be a poor solvent having low solubility of the $C_{70}$ fullerene molecule (and the fullerene molecule). As the solvent system, a polar solvent is mentioned. Specific examples thereof include alcohol solvents such as methyl alcohol, ethyl alcohol, n-propyl alcohol, isopropyl alcohol, butyl alcohol and pentanol, and polyhydric alcohols such as ethylene glycol.

A substance other than the second solvent, which accelerates precipitation of the $C_{70}$ thin line ($C_{70}$ thin line made of the $C_{70}$ fullerene molecule and the fullerene molecule) may be added to the second solvent. For example, an alkali metal element, an alkaline earth metal element, a hydroxide of an alkali metal element or an alkaline earth metal element, an alkoxide, other organic or inorganic compounds and the like may be added either singly or in combination. The addition thereof can accelerate the growth of the $C_{70}$ thin line ($C_{70}$ thin line made of the $C_{70}$ fullerene molecule and the fullerene molecule). The reason is considered as follows. Since the $C_{70}$ fullerene molecule (and the fullerene molecule) has high electron affinity, a charge condition of the $C_{70}$ fullerene molecule (and the fullerene molecule) is changed by charge transfer from an element by which an electron is apt to be released. A change in electron density around the $C_{70}$ fullerene molecule (and the fullerene molecule) influences the state of the chemical bond between the $C_{70}$ fullerene molecules (and the fullerene molecules). Accordingly, it has an influence on a growth mechanism of the $C_{70}$ thin line ($C_{70}$ thin line made of the $C_{70}$ fullerene molecule and the fullerene molecule). Therefore, the growth of the $C_{70}$ thin line ($C_{70}$ thin line made of the $C_{70}$ fullerene molecule and the fullerene molecule) can be more accelerated by adding an appropriate amount of an alkali metal element, an alkaline earth metal element or the like to the second solvent.

In the process for producing the $C_{70}$ fullerene tube in the invention of this application, the liquid-liquid interface is formed between the $C_{70}$ fullerene molecule (and the fullerene molecule) and the second solvent, and the $C_{70}$ thin line ($C_{70}$ thin line made of the $C_{70}$ fullerene molecule and the fullerene molecule) can be precipitated from the solution of the $C_{70}$ fullerene molecule (and the fullerene molecule).

Such a liquid-liquid interface can be formed such that the first solvent and the second solvent are solvent systems of types which are not mixed with each other. It is unnecessary to form the liquid-liquid interface such that the first solvent and the second solvent are permanently separated, and they may be mixed while they are allowed to stand still. Accordingly, an especially preferable combination is, for example, a combination of pyridine as the first solvent and isopropyl alcohol as the second solvent.

Moreover, the liquid-liquid interface can be formed by gently adding the second solvent to the $C_{70}$ fullerene molecule (and the fullerene molecule). This method is especially effective when the first solvent and the second solvent are made of solvent systems of types which are mixed with each other at least partially. As a method in which the second solvent is gently added to the solution of the $C_{70}$ fullerene molecule (and the fullerene molecule), there is a method (wall method) in which the second solvent is added along a wall surface of a container filled with the solution of the $C_{70}$ fullerene molecule (and the fullerene molecule). Or a method (dropwise addition method) in which the second solvent is gently added dropwise to a container filled with the solution of the $C_{70}$ fullerene molecule (and the fullerene molecule).

The liquid-liquid interface is formed, and then allowed to stand still for from one day to one month or more by maintaining the temperature of the solution at from 3° C. to 30° C. to precipitate the $C_{70}$ thin line ($C_{70}$ thin line made of the $C_{70}$ fullerene molecule and the fullerene molecule). During this time, the inside of the $C_{70}$ thin line ($C_{70}$ thin line made of the $C_{70}$ fullerene molecule and the fullerene molecule) is selectively dissolved, whereby the $C_{70}$ fullerene tube with the hollow structural portion can be obtained. In order to selectively dissolve the inside of the $C_{70}$ thin line ($C_{70}$ thin line made of the $C_{70}$ fullerene molecule and the fullerene molecule) efficiently, it is considered to be allowed to stand still at a temperature close to room temperature.

Especially when the $C_{70}$ fullerene tube made of the two molecules, the $C_{60}$ fullerene molecule and the $C_{70}$ fullerene molecule is produced by the foregoing method, it is advantageous that, for example, the $C_{60}$ fullerene molecule and the $C_{70}$ fullerene molecule are dissolved in pyridine to form a saturated solution (saturated solution A) and isopropyl alcohol (IPA) is added dropwise to this saturated solution A to form the liquid-liquid interface. The amount of IPA added to the saturated solution A may be any amount in terms of a volume ratio. It is advisable that the saturated A:IPA ratio is in the range of from 1:1 to 1:10. The temperature may be any temperature in the range of from 1° C. to 20° C. The range of from 7° C. to 13° C. is preferable. After the liquid-liquid interface is formed, it is allowed to stand still for from 10 minutes to 1 month, preferably from 2 days to 14 days as a growth time while maintaining a storage temperature at from 1° C. to 20° C., preferably from 7° C. to 13° C., whereby the $C_{70}$ fullerene tube with any composition of $0<x<1$ can be obtained in the composition $C_{60x}C_{70(1-x)}$ of the $C_{60}$ fullerene molecule and the $C_{70}$ fullerene molecule.

The $C_{70}$ fullerene tube produced by the process for producing the $C_{70}$ fullerene tube in the invention of this application can be obtained by separation from the solution via a general separation step such as filtration or centrifugation and removal of the solvents via heating in ambient atmosphere or by drying in ambient atmosphere at room temperature.

The embodiments of the invention are illustrated more specifically by referring to Examples. Of course, the invention is not limited to the following Examples. It goes without saying that various modifications are possible for details.

EXAMPLES

Example 1

<Production of a $C_{70}$ Fullerene Tube>

A $C_{70}$ powder (99%, MTR Co., Ltd.) was ultrasonically dissolved in 5 mL of pyridine ($C_5H_5N$) to produce a $C_{70}$ fullerene saturated solution. The $C_{70}$ fullerene saturated solution was charged into a 10-mL transparent glass bottle, and a nearly equal amount of isopropyl alcohol (IPA) was gently added thereto using a pipette to form a liquid-liquid interface such that the lower portion was the $C_{70}$ fullerene saturated solution and the upper portion was IPA. It was stored for one week by maintaining a liquid temperature of less than room temperature (from 5° C. to 25° C.). During the storage, the inside of the $C_{70}$ thin line was selectively dissolved to obtain a $C_{70}$ fullerene tube with a hollow structural portion.
<Observation With a Transmission Electron Microscope>

The $C_{70}$ fullerene tube formed in the glass bottle was then filtered and dried, and then heated in ambient atmosphere at approximately 250° C. for 4 hours to remove the solvents, and ultrasonic dispersion was conducted with methanol. The material was put on a carbon microgrid, and observed through a transmission electron microscope (JEM-4010, applied voltage 400 kV). The TEM image thereof is shown in FIG. 1. From FIG. 1, it has been found that the material is a $C_{70}$ nanotube having a length of 50 μm, an outer diameter of 475 nm and an inner diameter of 239 nm and made of a wall structure of approximately 120 nm.

Figure 2:
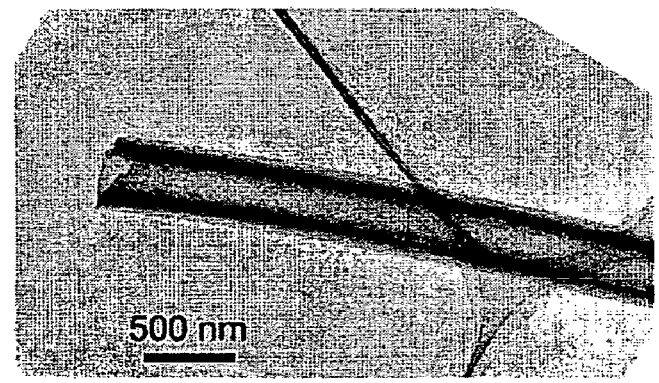
FIG. 2 is an enlarged TEM image of the $C_{70}$ fullerene tube in FIG. 1.

FIG. 2 is an enlarged TEM image of the $C_{70}$ fullerene tube in FIG. 1. From FIG. 2, it is found to have a hollow structure.

Figure 3:
FIG. 3 is a high-resolution TEM image of a wall of a $C_{70}$ fullerene tube.

FIG. 3 is a high-resolution TEM image (HRTEM image) of a wall of the $C_{70}$ fullerene tube. A spacing of 0.51 nm is equal to a half of a distance between centers of $C_{70}$ molecules arrayed along the most densely filled direction.

A lattice image is irregularly formed which is greatly influenced by irradiation damage with a high energy beam.

Figure 4:
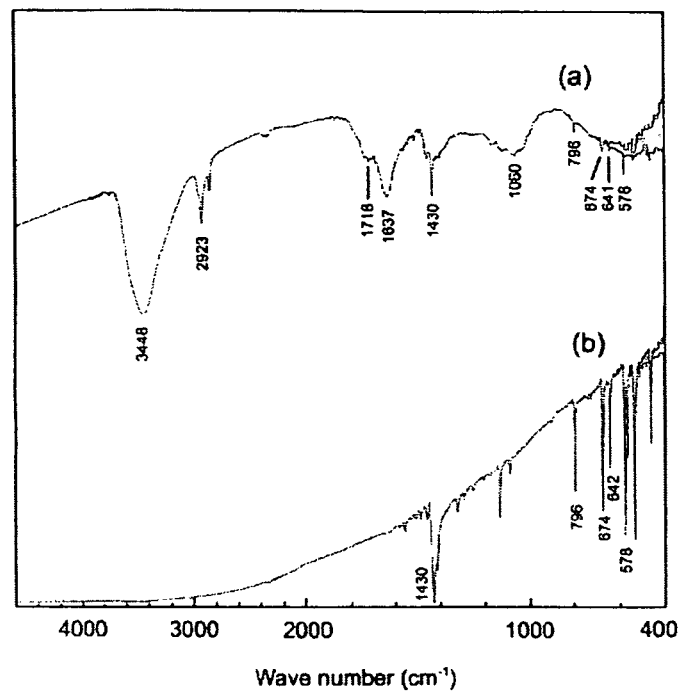
FIG. 4 is a spectrum of fast Fourier transform infrared spectroscopy (FT-IR) of (a) a $C_{70}$ fullerene tube and (b) a $C_{70}$ powder.

FIG. 4 shows a spectrum of fast Fourier transform infrared spectroscopy (FT-IR) of (a) the $C_{70}$ fullerene tube and (b) a $C_{70}$ powder. Absorption characteristic of the $C_{70}$ molecule can be observed in 578, 641, 674, 796 and 1430 cm$^{-1}$.

Figure 5:
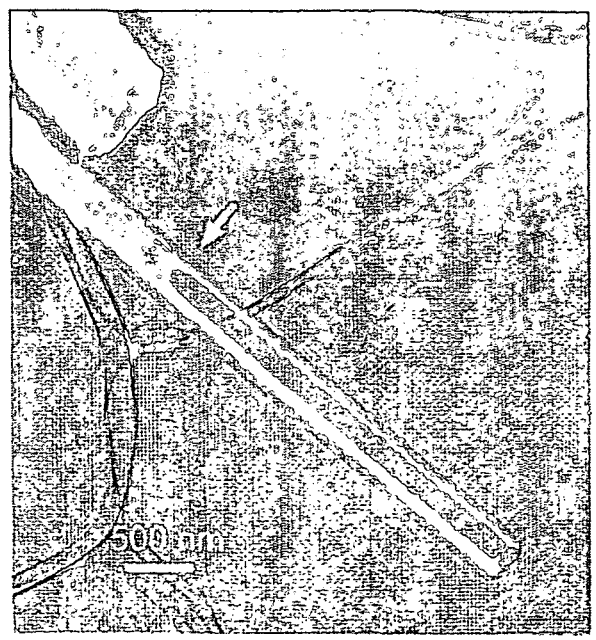
FIG. 5 is a TEM image of another $C_{70}$ fullerene tube produced in Example 1 of the invention of this application.

FIG. 5 shows a TEM image of another $C_{70}$ fullerene tube. This drawing shows the state in which the $C_{70}$ fullerene tube is changed from the hollow structure to the filled structure in a position shown by an arrow.

This proves a mechanism in which the $C_{70}$ nanowhisker (thin line) comes to have a hollow structure by selectively dissolving the inside. Cracking along the growth axis near the arrow is presumed to occur because the solvated inside is shrunk by heat treatment.

Example 2

Figure 6:
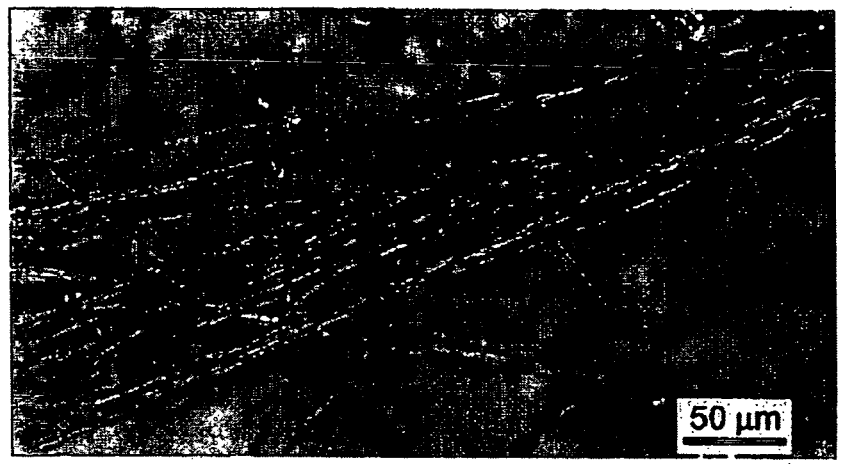
FIG. 6 is an optical microscope photograph of a $C_{70}$ fullerene tube in Example 2 of the invention of this application.

With respect to the $C_{70}$ fullerene tube formed in the glass bottle as produced in Example 1, it was dried in ambient atmosphere at room temperature instead of heating in ambient atmosphere at approximately 250° C. for 4 hours. An optical microscope photograph of this $C_{70}$ fullerene tube is shown in FIG. 6. According to this drawing, the $C_{70}$ fullerene tube is confirmed as a fibrous material having a diameter of more than approximately 200 nm and grown to a millimeter-order length.

Figure 7:
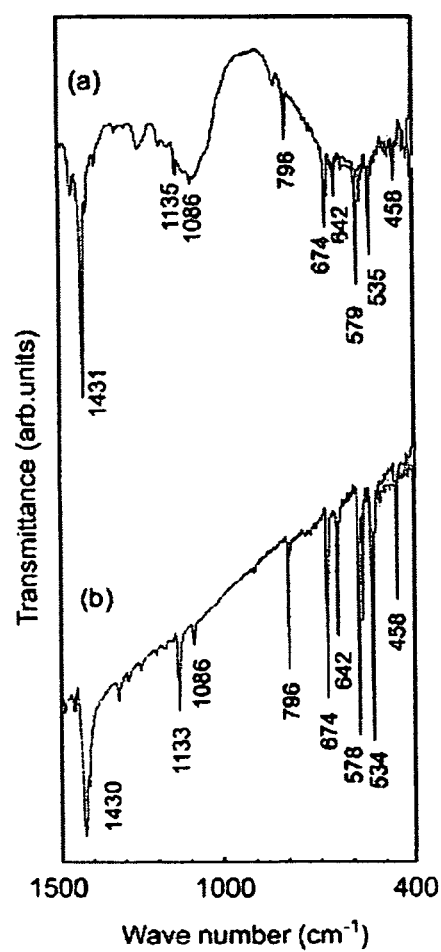
FIG. 7 is a spectrum of fast Fourier transform infrared spectroscopy (FT-IR) of (a) a $C_{70}$ fullerene tube dried in ambient atmosphere at room temperature and (b) a $C_{70}$ powder.

FIG. 7 shows a spectrum of fast Fourier transform spectroscopy (FT-IR) of (a) the $C_{70}$ fullerene tube dried in ambient atmosphere at room temperature and (b) the $C_{70}$ powder. Upon comparing (a) with (b), it is considered that absorption characteristic of the $C_{70}$ molecule can be found in the spectrum of fast Fourier transform infrared spectroscopy of (a) and the fibrous material shown in FIG. 6 is made of the $C_{70}$ molecule.

Figure 8:
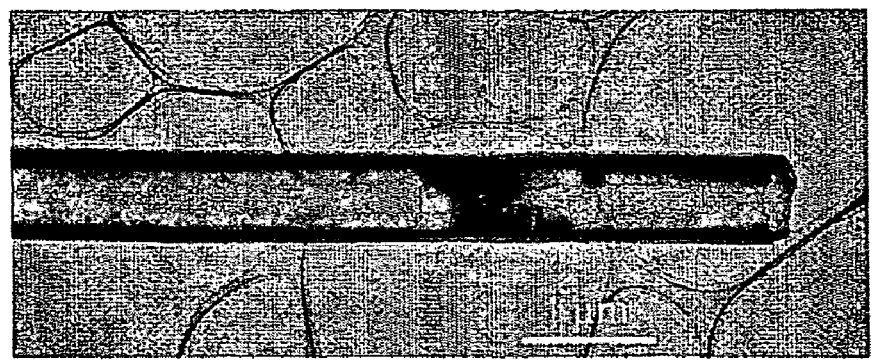
FIG. 8 is a TEM image of a $C_{70}$ fullerene tube in Example 2 of the invention of this application.

FIG. 8 shows a TEM image obtained by observing the fibrous material through a transmission electron microscope. According to this drawing, the material is found to be a $C_{70}$ nanotube having an outer diameter of 670 nm and an inner diameter of 460 nm. It is further found that microcrystals made of $C_{70}$ are incorporated into the $C_{70}$ nanotube.

Figure 9:
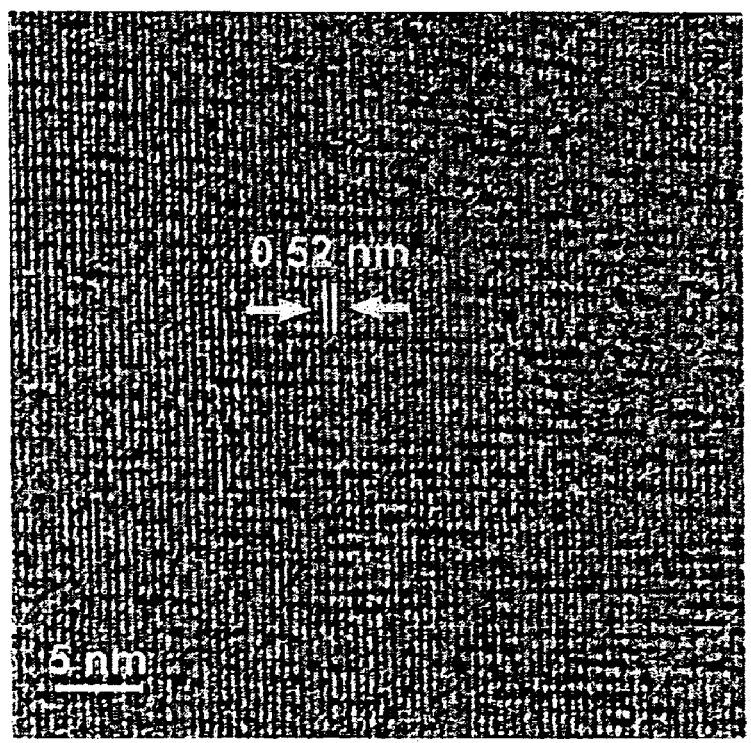
FIG. 9 is a high-resolution TEM image of a $C_{70}$ fullerene tube in Example 2 of the invention of this application.

FIG. 9 shows a high-resolution TEM image (HRTEM image) of a $C_{70}$ fullerene tube. A state in which $C_{70}$ molecules are filled most densely along the growth axis of the $C_{70}$ fullerene tube with spacings of approximately 1.0 nm.

Example 3

A pyridine saturated solution (solution A) of a fullerene soot ($C_{60}$-27 mass % $C_{70}$ composition) was prepared, and this was charged in a 10-mL transparent glass bottle. Further, isopropyl alcohol (IPA) was gently added using a pipette to form a liquid-liquid interface such that the lower portion was the solution A and the upper portion was IPA. Regarding the amount of IPA added to this solution A, a solution A:IPA ratio was from 1:1 to 1:10 in terms of a volume ratio. The material was stored for from one day to one month by maintaining the liquid temperature at from 10° C. to 20° C. to obtain a $C_{70}$ fullerene tube made of two components, a $C_{60}$ fullerene molecule and a $C_{70}$ fullerene molecule.

Figure 10:
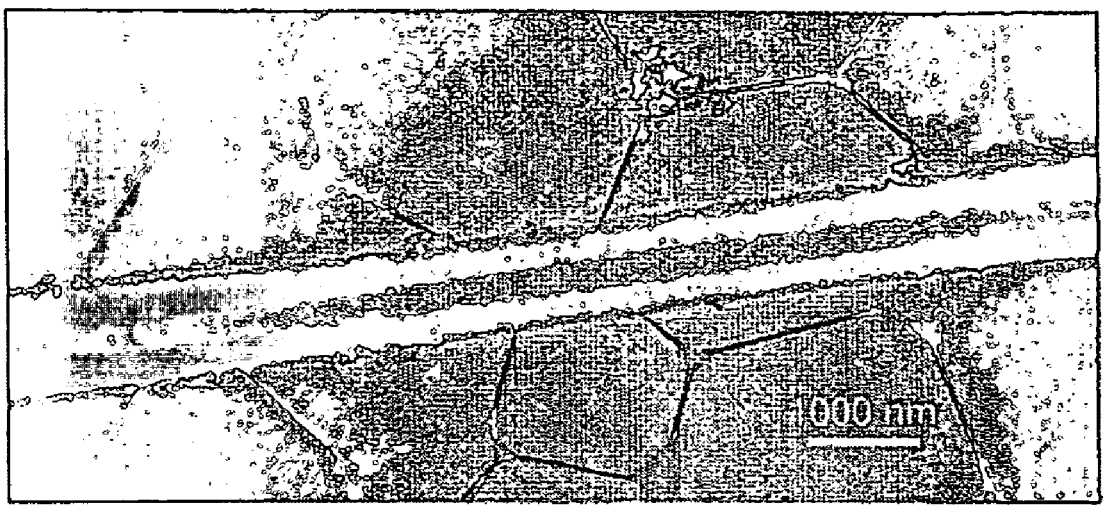
FIG. 10 is a TEM image of a $C_{70}$ fullerene tube made of two components, a $C_{60}$ fullerene molecule and a $C_{70}$ fullerene molecule as produced in Example 3 of the invention of this application.

FIG. 10 shows a TEM image obtained by observing the fibrous material through a transmission electron microscope. According to this drawing, it is found that the material is 990 nm in outer diameter and 280 nm in inner diameter and has a wall structure of approximately 355 nm. The wall thickness is approximately three times as large as that of the $C_{70}$ fullerene tube observed in Example 1. It can be interpreted that this large wall thickness is provided because the $C_{60}$ fullerene tube is contained as a component and elution inside the fiber is difficult in comparison with the $C_{70}$ fullerene tube.

Figure 11:
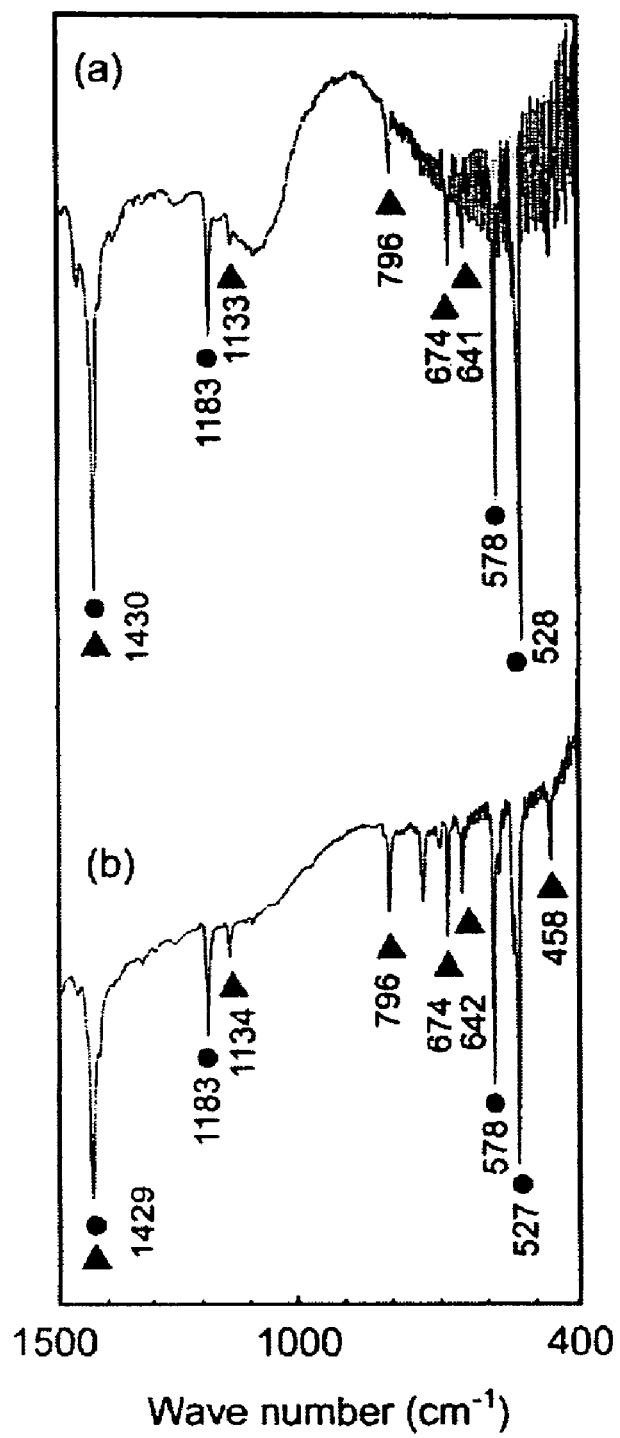
FIG. 11 is a spectrum of fast Fourier transform infrared spectroscopy (FT-IR) of (a) a $C_{70}$ fullerene tube made of two components, a $C_{60}$ fullerene molecule and a $C_{70}$ fullerene molecule and (b) a $C_{60}$-27 mass % $C_{70}$ starting powder used to produce this fullerene tube.

FIG. 11 shows a spectrum of fast Fourier transform infrared spectroscopy (FT-IR) of (a) the $C_{70}$ fullerene tube made of two components, the $C_{60}$ fullerene molecule and the $C_{70}$ fullerene molecule and (b) a $C_{60}$-27 mass % $C_{70}$ starting powder used to produce this fullerene tube. Upon comparing (a) with (b), absorption peak shown by a black circle, which is ascribable to the $C_{60}$ fullerene molecule and absorption peak shown by a black triangle, which is ascribable to the $C_{70}$ fullerene molecule can be found in the spectrum of fast Fourier transform infrared spectroscopy of (a). Accordingly, it can be confirmed that the fullerene tube shown in (a) is made of two components, the $C_{60}$ fullerene molecule and the $C_{70}$ fullerene molecule.

Figure 12:
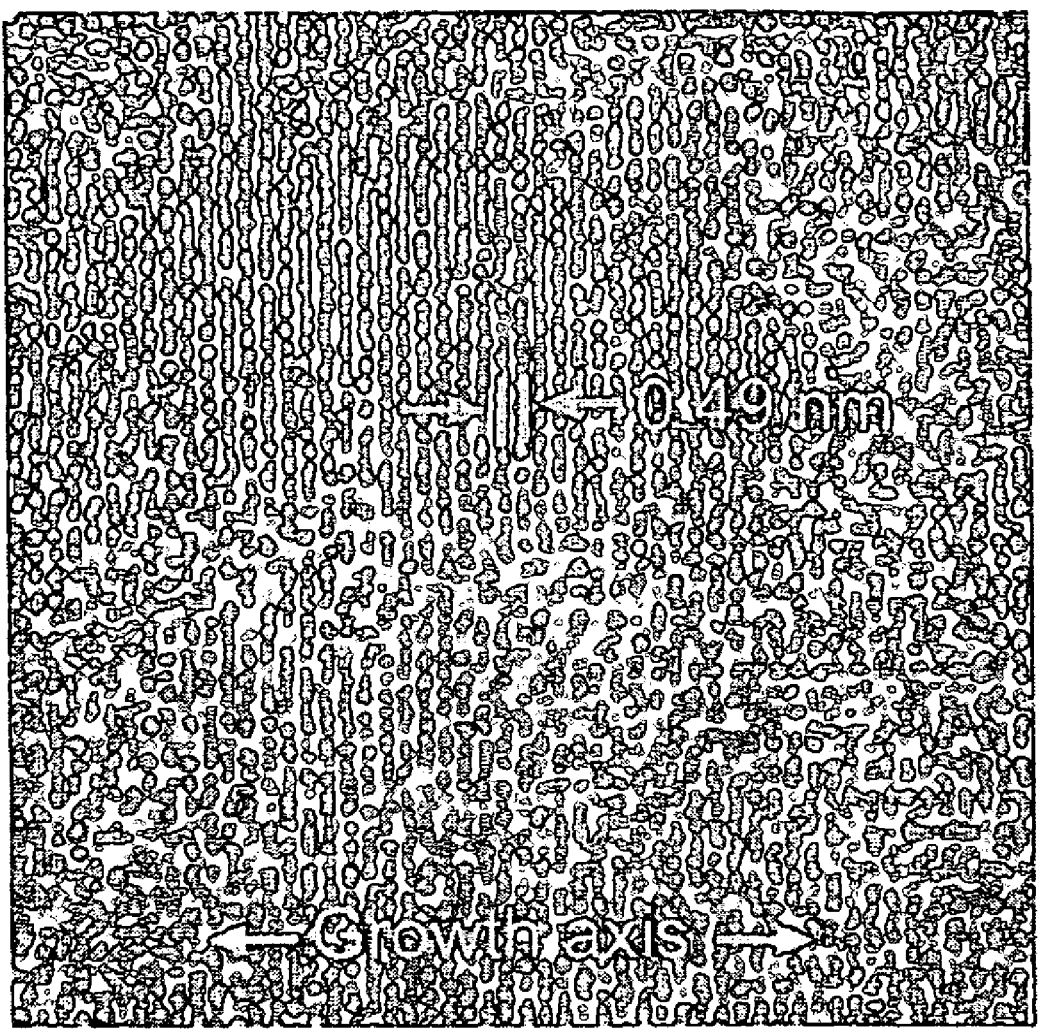
FIG. 12 is a high-resolution TEM image of a $C_{70}$ fullerene tube made of two components, a $C_{60}$ fullerene molecule and a $C_{70}$ fullerene molecule in Example 3 of the invention of this application.

FIG. 12 is a high-resolution TEM image (HRTEM image) of the $C_{70}$ fullerene tube made of two components, the $C_{60}$ fullerene molecule and the $C_{70}$ fullerene molecule. From this drawing, it is found that the $C_{60}$ fullerene molecule and the $C_{70}$ fullerene molecule are filled most densely along the growth axis of the fullerene tube. An average adjacent spacing of a fullerene cage is 0.98 nm which is smaller than 1.0 nm of a $C_{70}$ cage spacing shown in FIG. 9. The reduction in fullerene cage spacing observed here occurs because the $C_{60}$ molecule smaller than the $C_{70}$ molecule is contained as a constituent.

Example 4

In a 50-mL transparent glass bottle, a $C_{60}$-24 mol % $C_{70}$ powder was dissolved in pyridine to form a saturated solution. Isopropyl alcohol (IPA) in an amount which was three times (volume ratio) as large as the amount of the saturated solution was added thereto to form a liquid-liquid interface which was allowed to stand still at 10° C. for 5 days, whereby a $C_{70}$ fullerene tube made of two components, $C_{60}$ and $C_{70}$ was synthesized.

Figure 13:
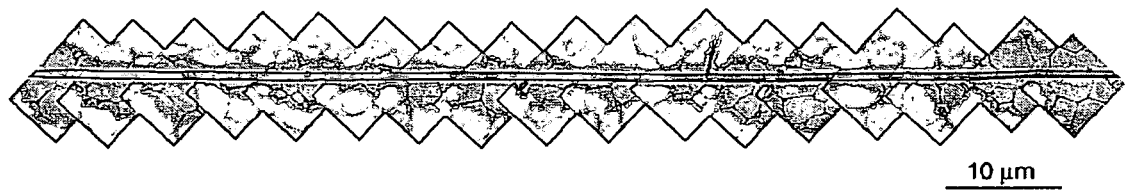
FIG. 13 is a TEM image of a $C_{70}$ fullerene tube made of two components, a $C_{60}$ fullerene molecule and a $C_{70}$ fullerene molecule as produced in Example 4 of the invention of this application.

FIG. 13 shows a TEM image obtained by observing the $C_{70}$ fullerene tube through a transmission electron microscope.

This $C_{70}$ fullerene tube has been found to have a $C_{60}$-15 mol % $C_{70}$ composition by fast Fourier infrared spectroscopy (FT-IR).

Example 5

An inner diameter and an outer diameter of a $C_{70}$ fullerene tube synthesized with several batches by the liquid-liquid interfacial precipitation method as in Example 1 were measured, and their relation was examined.

Figure 14:
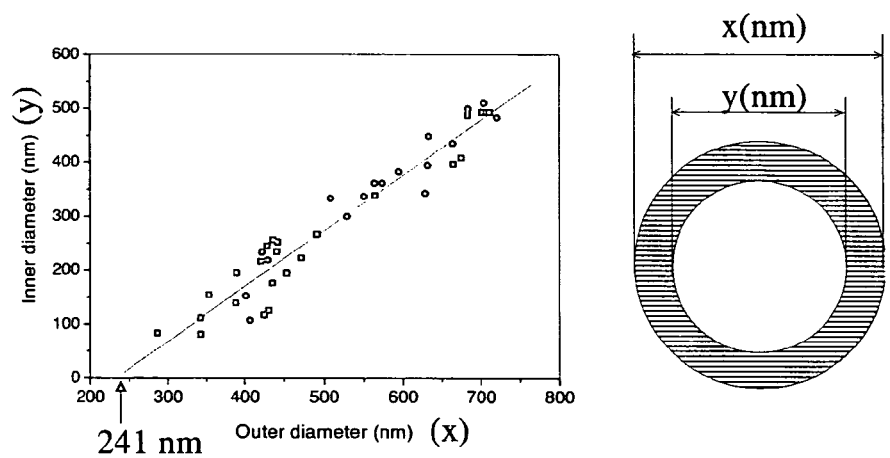
FIG. 14 is a graph showing a relation of an inner diameter (y, nm) and an outer diameter (x, nm) of a $C_{70}$ fullerene tube.

FIG. 14 shows results of measuring the inner diameter (y, nm) and the outer diameter (x, nm) of the $C_{70}$ fullerene tube.

From FIG. 14, it has been found that a linear relation (for example, y=1.03x−241) is established between the inner diameter and the outer diameter of the $C_{70}$ fullerene tube. Further, it has been confirmed from FIG. 14 that the average wall thickness of the $C_{70}$ fullerene tube is in the range of from 95 to 130 nm. This result shows that for the $C_{70}$ fullerene tube to have the hollow structure, at least the outer diameter has to be approximately 200 nm or more.

Industrial Applicability

The $C_{70}$ fullerene tube obtained in the invention of this application can be expected as a new functional material which is useful for a capsule for containing various chemical substances, a reaction site, a gas adsorbent, a catalyst supporting material, an electrode material and the like, it can effectively be utilized on an industrial scale.

Further, the $C_{70}$ fullerene tube in the first to eighth inventions of this application can be a functional material useful for a capsule for containing various chemical substances, a reaction site, a gas adsorbent, a catalyst supporting material, an electrode material and the like.

According to the process for producing the $C_{70}$ fullerene tube in the ninth to eleventh inventions, the $C_{70}$ thin line having the hollow structure or the $C_{70}$ thin line made of the fullerene molecule and the $C_{70}$ fullerene molecule can be obtained by the liquid-liquid interfacial precipitation method using the $C_{70}$ fullerene solution or the solution containing the fullerene molecule of at least any of the $C_{60}$ fullerene, the higher-order fullerenes other than the $C_{70}$ fullerene, the fullerene derivatives and the metal-containing fullerenes and the $C_{70}$ fullerene molecule easily for a relatively short period of time.

The invention claimed is:

1. A $C_{70}$ nanotube which is a thin line with a hollow structural portion made of a $C_{70}$ fullerene molecule, wherein a wall thickness of the nanotube is in the range of from 1 to 500 nm, and an outer diameter of the nanotube is in the range from 200 to 1000 nm, wherein an inner diameter of the nanotube is linearly related to the outer diameter of the nanotube throughout the hollow structural portion.

2. The $C_{70}$ nanotube as claimed in claim 1, further comprising a fullerene molecule of at least one selected from the group consisting of a $C_{60}$ fullerene, higher-order fullerenes other than a $C_{70}$ fullerene, fullerene derivatives and metal-containing fullerenes.

3. The $C_{70}$ nanotube as claimed in claim 2, which is made of two molecules, the $C_{60}$ fullerene molecule and the $C_{70}$ fullerene molecule, wherein the composition of the $C_{60}$ fullerene molecule and the $C_{70}$ fullerene molecule is $C_{60x}C_{70(1-x)}$ (0<x<1).

4. The $C_{70}$ nanotube as claimed in any of claims 1 to 3, whose end is closed or open.

5. A $C_{70}$ nanotube which is a thin line with a hollow structural portion made of a $C_{70}$ fullerene molecule, wherein a wall thickness of the nanotube is in the range of from 95 to 130 nm, and an outer diameter of the nanotube is in the range from 200 to 1000 nm, wherein an inner diameter of the nanotube is linearly related to the outer diameter of the nanotube throughout the hollow structural portion.

6. The $C_{70}$ nanotube as claimed in claim 5, further comprising a fullerene molecule of at least one selected from the group consisting of a $C_{60}$ fullerene, higher-order fullerenes other than a $C_{70}$ fullerene, fullerene derivatives and metal-containing fullerenes.

7. The $C_{70}$ nanotube as claimed in claim 6, which is made of two molecules, the $C_{60}$ fullerene molecule and the $C_{70}$ fullerene molecule, wherein the composition of the $C_{60}$ fullerene molecule and the $C_{70}$ fullerene molecule is $C_{60x}C_{70(1-x)}$ (0<x<1).

8. The $C_{70}$ nanotube as claimed in any of claims 5 to 7, whose end is closed or open.

9. A process for producing a $C_{70}$ nanotube which is a thin line with a hollow structural portion made of a $C_{70}$ fullerene molecule, wherein a wall thickness of the nanotube is in the range of from 1 to 500 nm, and an outer diameter of the nanotube is in the range from 200 to 1000 nm, wherein an inner diameter of the nanotube is linearly related to the outer diameter of the nanotube throughout the hollow structural portion, the process comprising at least the following steps,
(A) a step of adding isopropyl alcohol to a solution of the $C_{70}$ fullerene molecule in pyridine, wherein the isopropyl alcohol has lower solubility of the $C_{70}$ fullerene molecule than that in the pyridine,
(B) a step of forming a liquid-liquid interface between the solution and the isopropyl alcohol, (C) a step of precipitating the $C_{70}$ thin line in the liquid-liquid interface, and (D) a step of selectively dissolving the inside of the $C_{70}$ thin line.

10. A process for producing a $C_{70}$ nanotube which is a thin line with a hollow structural portion made of a $C_{70}$ fullerene molecule, wherein a wall thickness of the nanotube is in the range of from 1 to 500 nm, and an outer diameter of the nanotube is in the range from 200 to 1000 nm, wherein an inner diameter of the nanotube is linearly related to the outer diameter of the nanotube throughout the hollow structural portion, the process comprising at least the following steps, (A) a step of adding isopropyl alcohol to a solution obtained by dissolving a fullerene molecule of at least one selected from the group consisting of a $C_{60}$ fullerene, higher-order fullerenes other than a $C_{70}$ fullerene, fullerene derivatives and metal-containing fullerenes, and the $C_{70}$ fullerene molecule, in pyridine, wherein the isopropyl alcohol has lower solubility of the fullerene molecule and the $C_{70}$ fullerene molecule than that in the pyridine, (B) a step of forming a liquid-liquid interface between the solution and the isopropyl alcohol, (C) a step of precipitating the $C_{70}$ thin line made of the fullerene molecule and the $C_{70}$ fullerene molecule in the liquid-liquid interface, and (D) a step of selectively dissolving the inside of the $C_{70}$ thin line.

\* \* \* \* \*